(12) United States Patent
Miyazawa et al.

(10) Patent No.: US 10,542,369 B2
(45) Date of Patent: Jan. 21, 2020

(54) SOUND CONTROL APPARATUS, PROGRAM, AND CONTROL METHOD

(71) Applicant: SONY CORPORATION, Tokyo (JP)

(72) Inventors: Yusuke Miyazawa, Tokyo (JP); Yasushi Okumura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 14/694,221

(22) Filed: Apr. 23, 2015

(65) Prior Publication Data

US 2015/0237456 A1 Aug. 20, 2015

Related U.S. Application Data

(63) Continuation of application No. 13/487,708, filed on Jun. 4, 2012, now Pat. No. 9,055,157.

(30) Foreign Application Priority Data

Jun. 9, 2011 (JP) .................... 2011-128983

(51) Int. Cl.
*H04S 7/00* (2006.01)
*H04M 1/60* (2006.01)
*H04M 1/725* (2006.01)

(52) U.S. Cl.
CPC .......... *H04S 7/304* (2013.01); *H04M 1/6058* (2013.01); *H04M 1/6016* (2013.01); *H04M 1/72519* (2013.01); *H04S 2400/11* (2013.01)

(58) Field of Classification Search
CPC ...... H04S 7/304; H04S 1/005; H04S 2420/01; H04S 7/303; H04M 1/6016;
(Continued)

(56) References Cited

U.S. PATENT DOCUMENTS 6,061,718 A * 5/2000 Nelson ............... G06Q 10/107
   379/52
6,191,773 B1 * 2/2001 Maruno ............... G06F 3/017
   345/156
(Continued)

FOREIGN PATENT DOCUMENTS

JP 2000-046577 2/2000
JP 2002-257581 9/2002
(Continued)

OTHER PUBLICATIONS

Jan. 26, 2016, CN communication issued for related CN application No. 201210180549.4.

*Primary Examiner* — Jason R Kurr
(74) *Attorney, Agent, or Firm* — Paratus Law Group, PLLC

(57) ABSTRACT

An apparatus may include a hardware processor and a storage medium. The storage medium may be coupled to the processor, and may store instructions. When executed by the processor, the instructions may cause the apparatus to receive a direction signal indicating a first direction in which a head of a user is facing with respect to a fixed direction. The instructions may also cause the apparatus to convert the first direction in which the head is facing with respect to the fixed direction into a second direction in which the head is facing with respect to a third direction, connecting the head and an object. Additionally, the instructions may cause the apparatus to generate an audio signal having characteristics such that a sound generated from the audio signal is perceived by the user as arriving from the third direction.

23 Claims, 14 Drawing Sheets

(58) Field of Classification Search
CPC ............ H04M 1/72519; H04M 1/6058; H04N 13/0429; H04N 13/0468; H04N 13/0472; H04N 13/0475; H04N 13/0477; H04N 13/0479; H04N 13/0481; G02B 27/017; G02B 2027/0187; G10L 15/00; G10L 15/26; G10L 15/265; G06Q 30/0261; G06Q 30/0251
USPC ......... 381/309, 310, 311, 74, 370, 306, 104, 381/107; 705/14.58, 14.64; 700/94; 463/35

See application file for complete search history.

(56) References Cited

U.S. PATENT DOCUMENTS

| | | | |
|---|---|---|---|
| 6,766,028 B1 | 7/2004 | Dickens | |
| 7,489,979 B2 | 2/2009 | Rosenberg | |
| 7,756,274 B2 | 7/2010 | Layton et al. | |
| 7,936,887 B2 | 5/2011 | Smyth | |
| 9,213,405 B2* | 12/2015 | Perez | H04N 21/25891 |
| 10,031,576 B2* | 7/2018 | Cunningham | G10L 13/02 |
| 2002/0151996 A1* | 10/2002 | Wilcock | G06F 3/167 |
| | | | 700/94 |
| 2008/0253547 A1 | 10/2008 | Berndt et al. | |
| 2009/0034766 A1 | 2/2009 | Hamanaka et al. | |
| 2011/0026765 A1* | 2/2011 | Ivanich | H04N 5/4403 |
| | | | 382/103 |
| 2011/0144989 A1* | 6/2011 | Dowlatkhah | H04M 3/5322 |
| | | | 704/235 |
| 2012/0002822 A1* | 1/2012 | Peissig | G06F 3/012 |
| | | | 381/74 |
| 2012/0257035 A1* | 10/2012 | Larsen | G06F 3/013 |
| | | | 348/78 |
| 2013/0116811 A1 | 5/2013 | Pedersen | |
| 2013/0194164 A1* | 8/2013 | Sugden | G02B 27/017 |
| | | | 345/8 |
| 2013/0321265 A1* | 12/2013 | Bychkov | G06F 3/013 |
| | | | 345/156 |

FOREIGN PATENT DOCUMENTS

| | | |
|---|---|---|
| JP | 2004-145243 | 5/2004 |
| JP | 2005-343431 | 12/2005 |
| JP | 2005-354223 | 12/2005 |
| JP | 2007-215228 | 8/2007 |
| JP | 2008-092193 | 4/2008 |
| WO | WO2006/137400 A1 | 12/2006 |

* cited by examiner

| Shop | Restaurant | × |
|---|---|---|
| | CD shop | ○ |
| | Bookstore | × |
| Building | Modern architecture | ○ |
| | Historical architecture | × |

FIG.5

SOUND CONTROL APPARATUS, PROGRAM, AND CONTROL METHOD

CROSS REFERENCE TO PRIOR APPLICATION

This application is a continuation of U.S. patent application Ser. No. 13/487,708 (filed on Jun. 4, 2012), which claims priority to Japanese Patent Application No. 2011-128983 (filed on Jun. 9, 2011), which are all hereby incorporated by reference in their entirety.

BACKGROUND

The present disclosure relates to a technique of a sound control apparatus that controls sounds from headphones and earphones, and the like.

From the past, a technique of controlling sound signals of headphones and earphones such that sounds are heard from a certain direction is known.

Japanese Patent Application Laid-open No. 2008-92193 discloses a technique of arranging a plurality of virtual sound sources related to music in virtual sound source space and controlling sound signals from headphones such that the music is heard from the plurality of virtual sound sources. For example, assuming that a user wearing headphones faces rightwardly from a state where he/she is facing front, music that has been heard from the front direction when the user is facing front is heard from the left-hand direction, and music that has been heard from the right-hand direction when the user is facing front is heard from the front direction.

SUMMARY

There is a need for a technique for presenting simple information on a real object (or virtual object) such as a shop to a user from a direction in which the real object (or virtual object) exists and obtaining more-specific information as the user carries out some kind of an action with respect to the presented information.

Accordingly, there is disclosed an apparatus, which may include a hardware processor and a storage medium. The storage medium may be coupled to the processor, and may store instructions. When executed by the processor, the instructions may cause the apparatus to receive a direction signal indicating a first direction in which a head of a user is facing with respect to a fixed direction. The instructions may also cause the apparatus to convert the first direction in which the head is facing with respect to the fixed direction into a second direction in which the head is facing with respect to a third direction, connecting the head and an object. Additionally, the instructions may cause the apparatus to generate an audio signal having characteristics such that a sound generated from the audio signal is perceived by the user as arriving from the third direction.

There is also disclosed a method. The method may also include receiving a direction signal indicating a first direction in which a head of a user is facing with respect to a fixed direction. The method may also include converting the first direction in which the head is facing with respect to the fixed direction into a second direction in which the head is facing with respect to a third direction, connecting the head and an object. Additionally, the method may include generating an audio signal having characteristics such that a sound generated from the audio signal is perceived by the user as arriving from the third direction.

Additionally, there is disclosed a non-transitory, computer-readable storage medium storing instructions. When executed by a processor, the instructions may cause an apparatus to receive a direction signal indicating a first direction in which a head of a user is facing with respect to a fixed direction. The instructions may also cause the apparatus to convert the first direction in which the head is facing with respect to the fixed direction into a second direction in which the head is facing with respect to a third direction, connecting the head and an object. Additionally, the instructions may cause the apparatus to generate an audio signal having characteristics such that a sound generated from the audio signal is perceived by the user as arriving from the third direction.

According to an embodiment, there is provided a sound control apparatus including a sensor unit and a controller.

The controller is configured to judge a direction of a face of a user with respect to one of a real object present in space and a virtual object virtually arranged in space based on a signal from the sensor unit, control an output of a sound signal such that primary information on one of the real object and the virtual object is heard from a sound output unit from a direction corresponding to the direction of the face with respect to one of the real object and the virtual object, judge an action of the user with respect to the primary information based on the signal from the sensor unit, and control the output of the sound signal such that secondary information as a content more specific than the primary information is heard from the sound output unit according to the action.

In the sound control apparatus, sound signals of the sound output unit (e.g., headphones or earphones) are controlled such that primary information on a real object such as a shop and a building (e.g., "there is a shop") is heard from a direction in which the real object exists. Alternatively, assuming that a virtual object such as a mail program is virtually arranged in space, for example, sound signals of the sound output unit are controlled such that primary information on the virtual object (e.g., "mail received") is heard from a direction in which the virtual object is arranged.

When the user carries out an action with respect to the primary information, the action is detected by the sensor unit, and sound signals of the sound output unit are controlled such that secondary information as a content more specific than the primary information (e.g., specific information on shop and main content) is heard. As the user carries out an action with respect to the primary information, secondary information as a content more specific than the primary information can be heard.

The sound control apparatus may further include a communication unit. In this case, the controller may measure a position of the sound control apparatus, acquire positional information of the real object present in space via the communication unit, judge a distance between the sound control apparatus and the real object based on the positional information, and control the output of the sound signal such that the primary information on the real object is heard from the sound output unit when the distance becomes equal to or smaller than a predetermined threshold value (i.e., distance).

With this structure, when the distance between the sound control apparatus and the real object becomes equal to or smaller than a predetermined threshold value at a time the user is carrying the sound control apparatus, sound signals of the sound output unit are controlled such that the primary information on the real object is heard from the direction in which the real object exists.

If the user wishes secondary information (specific information) on the real object, the user only needs to carry out an action with respect to the primary information.

In the sound control apparatus, the controller may judge, as the action of the user with respect to the primary information, a movement of directing the face in the direction from which the primary information is heard, and control the output of the sound signal such that a volume of the secondary information becomes larger as the direction of the face approaches the direction from which the primary information is heard.

In the sound control apparatus, as the user faces the direction from which the primary information is heard when wishing for the secondary information, the volume of the secondary information becomes larger as the direction of the face approaches the direction from which the primary information is heard.

In the sound control apparatus, the controller may execute a main task and control the output of the sound signal such that the volume of the secondary information becomes larger and a volume of the main task becomes smaller as the direction of the face approaches the direction from which the primary information is heard.

In the sound control apparatus, as the user faces the direction from which the primary information is heard when wishing for the secondary information, the volume of the secondary information becomes larger, and, for example, a volume of music that is executed by the main task becomes smaller.

In the sound control apparatus, the controller may judge a movement of a head as the action of the user with respect to the primary information and control the output of the sound signal such that the secondary information is heard from the sound output unit when the head is moved up and down.

As a result, the user can hear the secondary information by moving the head up and down (nodding).

In the sound control apparatus, the controller may judge, as the action of the user with respect to the primary information, a movement of a head in a state where the user is directing the face toward the direction from which the primary information is heard, and judge whether to output the secondary information as the sound signal based on the movement of the head in the state where the face is directed toward the direction from which the primary information is heard.

With this structure, the user can select whether to hear the secondary information by merely moving the head while facing the direction from which the primary information is heard.

In the sound control apparatus, the controller may judge a movement of the head in the state where the user is directing the face toward the direction from which the primary information is heard, and control the output of the sound signal such that the secondary information is heard from the sound output unit based on the movement of the head in the state where the face is directed toward the direction from which the primary information is heard.

With this structure, the user can hear the secondary information by merely moving the head up and down (nodding) while facing the direction from which the primary information is heard.

In the sound control apparatus, the controller may control the output or the sound signal such that the secondary information is heard from a direction corresponding to the direction of the face with respect to one of the real object and the virtual object.

In the sound control apparatus, the sound output unit may be one of headphones and earphones.

BRIEF DESCRIPTION OF DRAWINGS

FIG. 5 is a diagram showing an example of a setting screen displayed for the user to set which information on a real object belonging to what category is to be presented;

DETAILED DESCRIPTION OF EMBODIMENTS

Hereinafter, embodiments of the present disclosure will be described with reference to the drawings.

[Overall Structure of Sound Control Apparatus 100 and Structures of Components]

Figure 1:
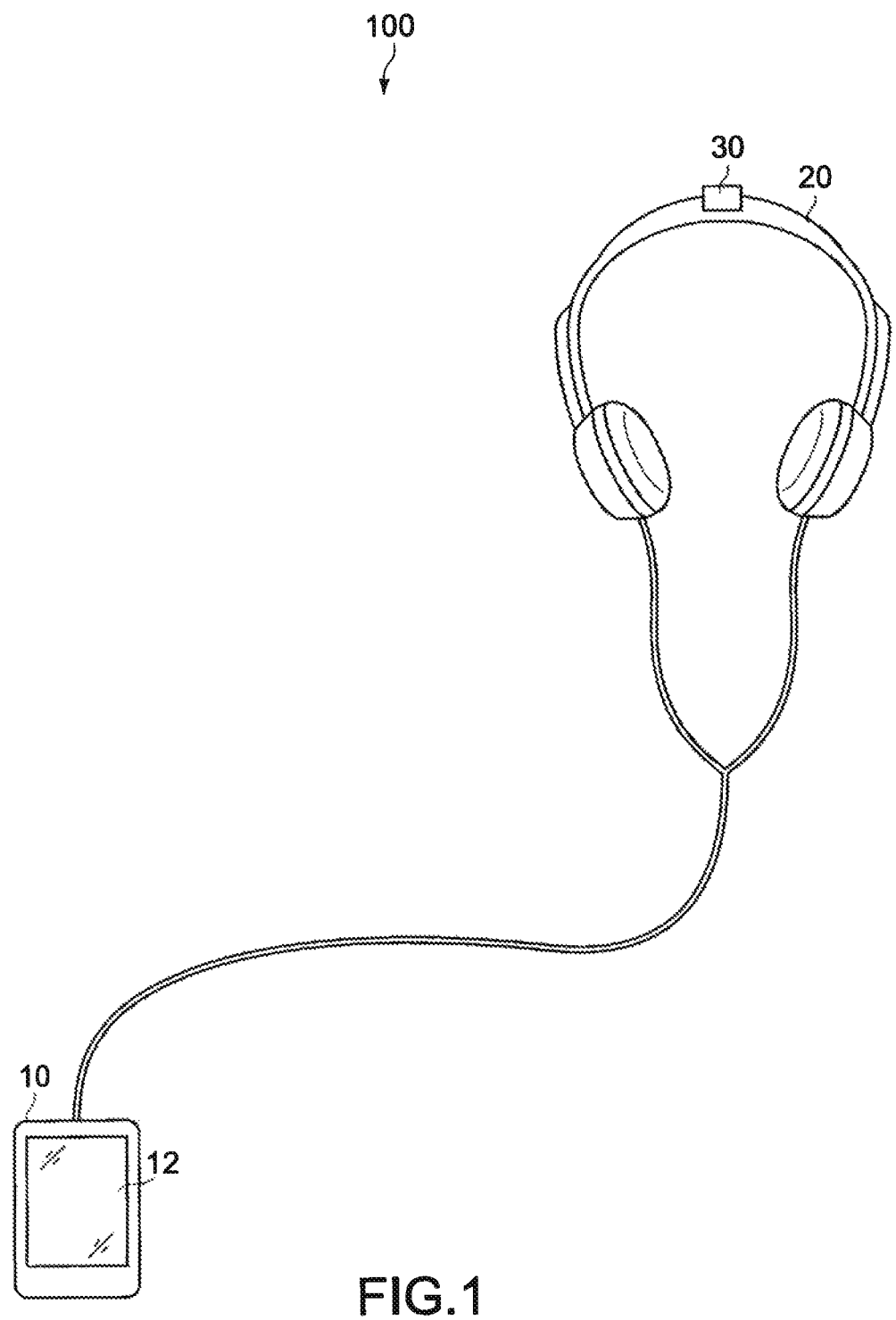
FIG. 1 is a diagram showing a sound control apparatus according to an embodiment of the present disclosure.
Figure 2:
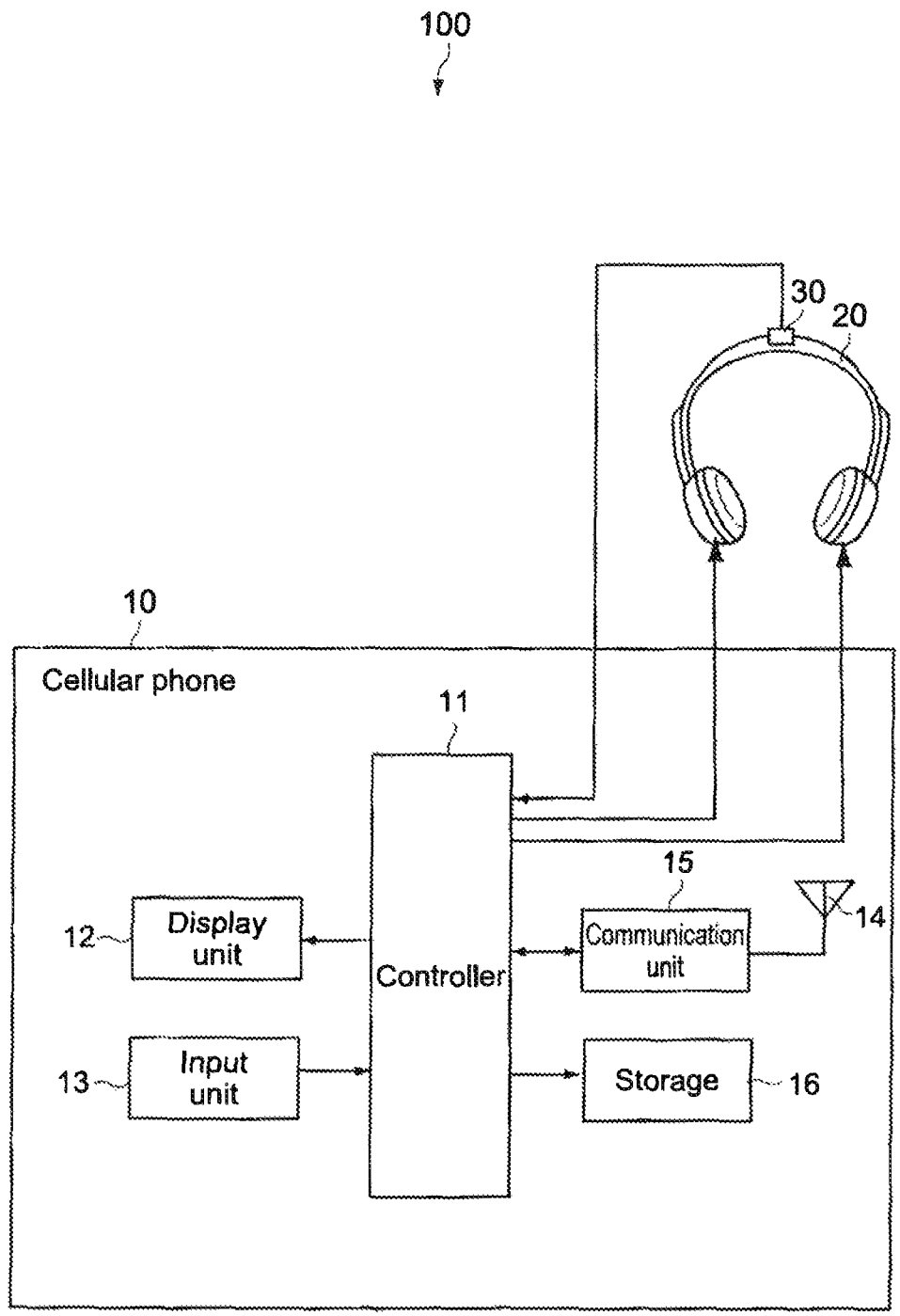
FIG. 2 is a block diagram showing an electrical structure of the sound control apparatus according to the embodiment of the present disclosure.

FIG. 1 is a diagram showing a sound control apparatus 100 according to an embodiment of the present disclosure. FIG. 2 is a block diagram showing an electrical structure of the sound corn apparatus 100. As shown in the figures, the sound control apparatus 100 includes a sound control apparatus body 10 (cellular phone 10), headphones 20 (sound output unit) connected to the sound control apparatus body 10, and a sensor unit 30 attached to the headphones 20. In the first embodiment, the cellular phone 10 is taken as an example of the sound control apparatus body 10.

The cellular phone 10 includes a controller 11, a display unit 12, an input unit 13, an antenna 14, a communication unit 15, and a storage 16. The cellular phone 10 also includes a communication speaker and a communication microphone (not shown).

The display unit 12 is constituted of, for example, a liquid crystal display or an EL (Electro-Luminescence) display. The input unit 13 includes a touch sensor that detects a user operation made by a finger, a stylus pen, and the like with respect to the display unit 12, and an input button provided on the cellular phone 10.

The storage 16 includes a volatile memory (e.g., RAM (Random Access Memory) and a nonvolatile memory (e.g., ROM (Read Only Memory). The volatile memory is used as a working area of the controller 11 and temporarily stores programs used for processing of the controller 11 and data such as music data and video data. The nonvolatile memory fixedly stores various programs requisite for Processing of the controller 11 and data such as music data and video data. The programs stored in the nonvolatile memory may be read out from a removable recording medium such as an optical disc and a semiconductor memory.

The controller 11 is constituted of a CPU (Central Processing Unit (i.e., hardware processor)) and the like. The controller 11 executes various operations based on the programs (i.e., instructions) stored in the storage (i.e., storage medium) 16.

The communication unit 15 executes processing of converting a frequency of radio waves transmitted and received by the antenna 14, modulation processing, demodulation processing, and the like. The antenna 14 transmits and receives communication radio waves and radio waves for packet communication for emails, web data, and the like.

The communication unit 15 is capable of communicating with an information management server (not shown). The information management server stores positional information of a real object 1 (e.g., shop and building) (see FIG. 4) present in space and primary and secondary information on the real object 1. The information management server also transmits, in response to requests from the cellular phone 10, the positional information of the real object 1 and the primary and secondary information on the real object 1.

The primary information on the real object 1 (e.g., shop and building) is simple information on the real object 1. On the other hand, the secondary information on the real object 1 is specific information on the real object 1. For example, the primary information is a shop name, a shop type, and the like in a case where the real object 1 is a shop and is a building name, a building type, and the like in a case where the real object 1 is a building. For example, the secondary information is a recommended product, opening hours, and the like in the case where the real object 1 is a shop and is a specific history and the like of a building in the case where the real object 1 is a building.

The sensor unit 30 is provided at, for example, a top portion of the headphones 20. The sensor unit 30 includes a direction sensor (e.g., geomagnetic sensor) that detects a direction of a face of a user (i.e., a direction in which a head of the user is facing) on earth (i.e., with respect to a fixed direction) and a motion (i.e., movement) sensor that detects a movement of a head of the user. Examples of the motion sensor include an angular velocity sensor (e.g., vibration gyro sensor and rotation top tyro sensor) and an acceleration sensor (e.g., piezoresistive sensor, piezoelectric sensor, and capacitance sensor). A combination of the angular velocity sensor and the acceleration sensor may be used as the motion sensor.

The sensor unit 30 includes an A/D conversion unit. Signals output from the direction sensor and the motion sensor (e.g., direction and movement signals, respectively) are A/D-converted and input to the controller 11 of the cellular phone 10.

Although the cellular phone 10 and the headphones 20 are connected by wires in FIGS. 1 and 2, the cellular phone 10 and the headphones 20 may communicate wirelessly.

[Descriptions on Operations]

Figure 3:
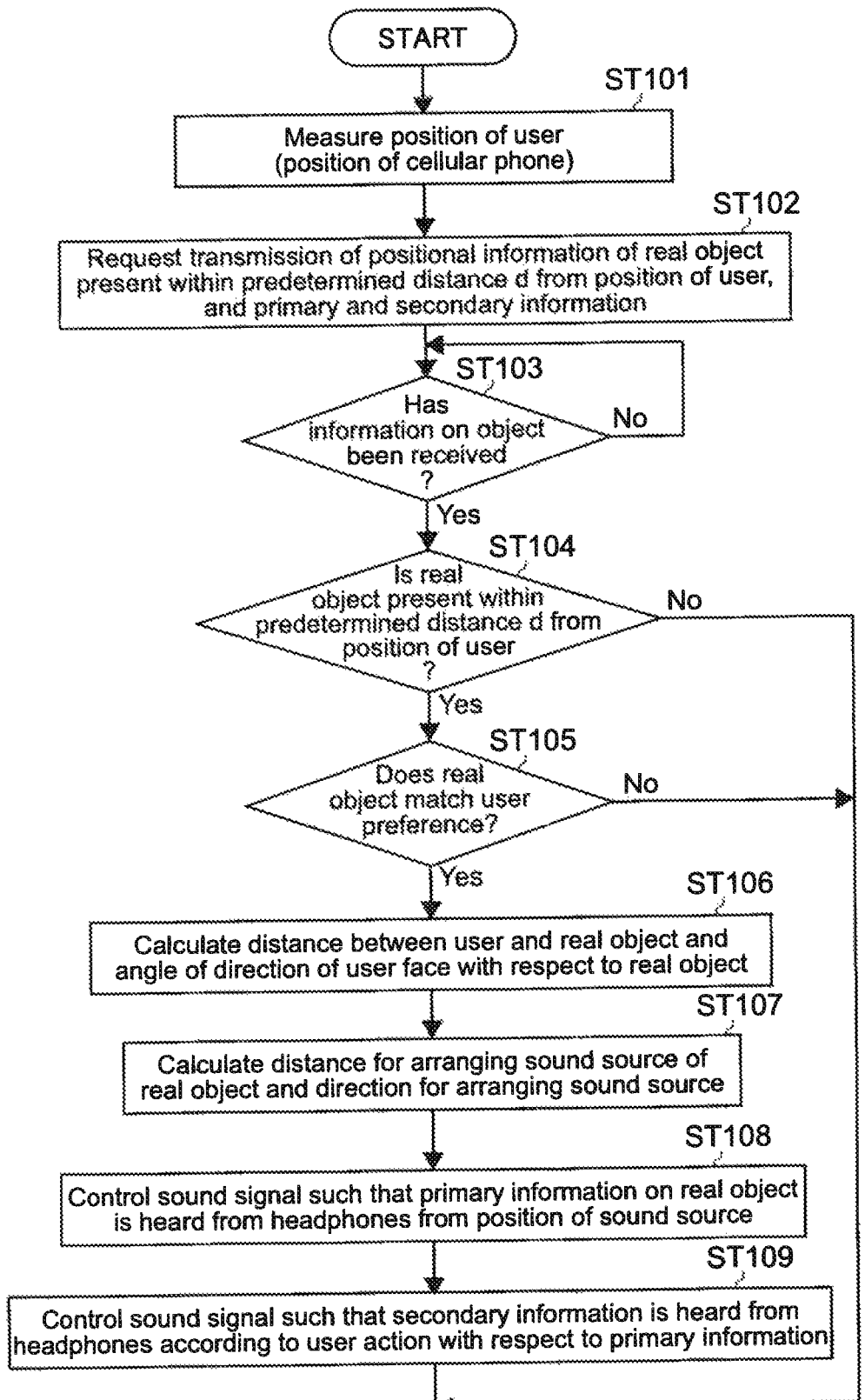
FIG. 3 is a flowchart showing processing of a controller of a cellular (i.e., mobile) phone according to the embodiment of the present disclosure.
Figure 4:
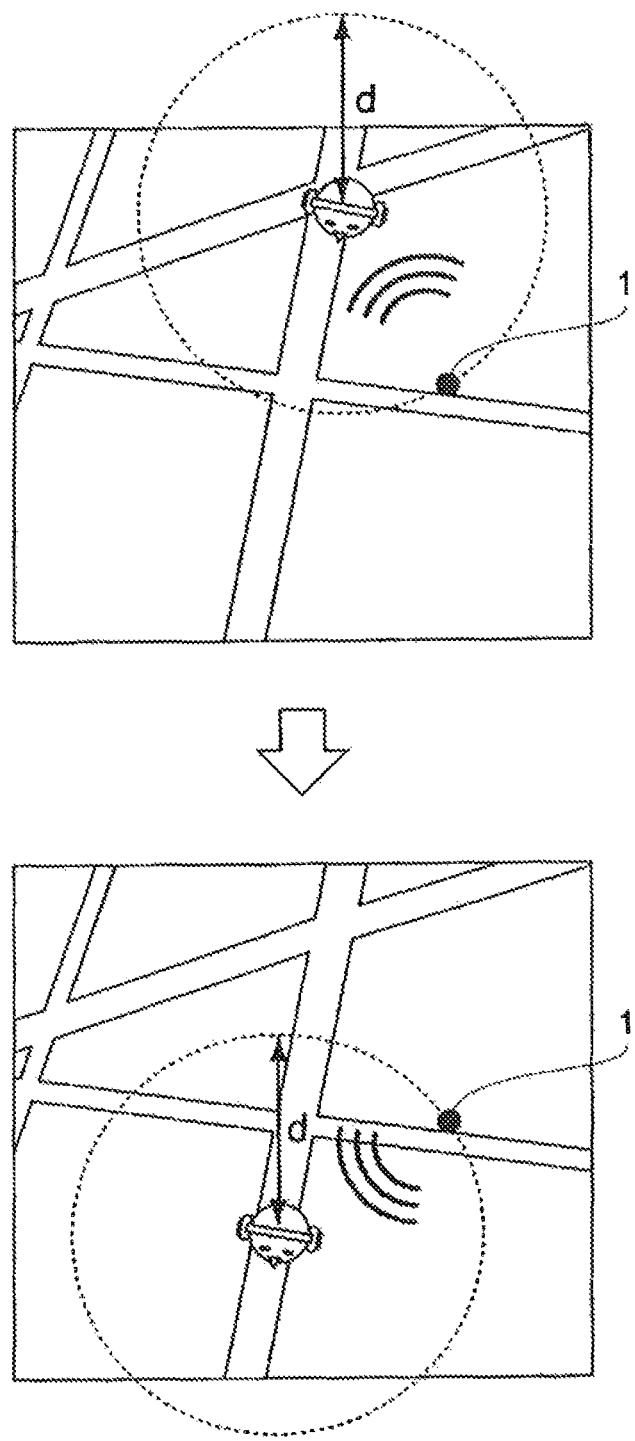
FIG. 4 is a complementary diagram for explaining the processing shown in FIG. 3, the diagram showing a state where a user is wearing headphones and walking on the ground.

Next, processing of the controller 11 of the cellular phone 10 of this embodiment will be described. FIG. 3 is a flowchart showing the processing of the cellular phone 10 (controller 11) of this embodiment. FIG. 4 is a complementary diagram for explaining the processing shown in FIG. 3, the diagram showing a state where a user is wearing the headphones 20 and walking on the ground.

First, the user walks on the ground while wearing the headphones 20. In this case, the user may walk while listening to sounds of music data or video data stored in the cellular phone 10.

As shown in FIG. 3, the controller 11 first receives radio waves (i.e., head position signals) from a GPS satellite via the antenna 14 and the communication unit 15 and measures a position of the user (position of cellular phone 10) based on the radio waves from the GPS satellite (Step 101). The measurement of the position of the user (position of cellular phone 10) is executed at a predetermined cycle.

Next, the controller 11 transmits, to the information management server, a request signal for positional information, primary information, and secondary information on a real object 1 (e.g., shop and building) present within a predetermined distance d from the position of the user (Step 102). The distance d is, for example, about 10 m to 2 km (see FIG. 4).

In response to the request signal, the information management server transmits the positional information (i.e., an object position signal), primary information, and secondary information on the real object 1 present within the predetermined distance d from the position of the user.

Upon receiving the information on the real object 1 (YES in Step 103), the controller 11 judges whether there exists a real object 1 that has information within the predetermined distance d from the position of the cellular phone 10 (position of user) (see FIG. 5) (Step 104).

When there is a real object 1 within the predetermined distance d from the position of the cellular phone 10 (YES in Step 104), the controller 11 judges whether the real object 1 matches a preference of the user (Step 105).

Here, what kind of information on the real object 1 the user wishes is set in advance. For example, the controller 11 displays on the display unit 12 a setting screen for setting which information on a real object 1 belonging to what category is to be presented out of the real objects 1 categorized into a plurality of categories.

FIG. 5 shows an example of the setting screen displayed for the user to set which information on a real object 1 belonging to what category is to be presented. In FIG. 5, the real objects 1 are categorized into a category of "shop" and a category of "building". In addition, in FIG. 5, the category of "shop" is categorized into categories of "restaurant", "CD shop", and "bookstore", and the category of "building" is categorized into "modern architecture" and "historical architecture".

FIG. 5 shows an example of a case where a CD shop and a modern architecture are selected as the user preference. The real object 1 selected based on the user preference is stored in the storage. When the user wishes to change the setting, "o" and "x" are inverted by a touch operation at portions where "o" and "x" are displayed.

Referring back to FIG. 3, when the real object 1 present within the predetermined distance d from the position of the user (position of cellular phone 10) is a real object 1 that matches the user preference (YES in Step 105), the controller 11 advances to Step 106. In Step 106, the controller 11 calculates a distance between the user (cellular phone 10) and the real object 1 and an angle of a direction of a face of the user with respect to the real object 1 (i.e., a direction in which the head is facing with respect to another direction, connecting the head and the real object 1).

The distance between the user and the real object 1 is calculated based on the positional information of the user and the positional information of the real object 1.

On the other hand, the angle of the direction of the face of the user is calculated based on the positional information of the cellular phone 10, the positional information of the real object 1, and information on a direction obtained by the direction sensor.

It should be noted that when a plurality of real objects 1 that match a user preference are present within the predetermined distance d from the cellular phone 10, the distance and the face direction are calculated for each of the plurality of real objects 1.

Next, the controller 11 calculates a distance for providing a sound source of the real object 1 and a direction for providing the sound source of the real object 1 (Step 107). The distance for providing the sound source of the real object 1 is determined based on the distance between the user and the real object 1. In other words, a sound source of a real object 1 that is close to the user is provided at a position close to the user whereas a sound source of a real object 1 that is distant from the user is provided at a position distant from the user. The direction for providing the sound source of the real object 1 is determined based on the angle of the direction of the face of the user with respect to the real object 1.

It should be noted that when a plurality of real objects 1 that match a user preference are present within the predetermined distance d from the cellular phone 10, the distance and direction of a sound source are calculated for each of the plurality of real objects 1.

After calculating the distance and direction for providing the sound source, the controller 11 controls an output of sound (i.e., audio) signals such that primary information is heard from a direction corresponding to the direction of the face with respect to the real object 1 (i.e., such that sound generated from the signals is perceived by the user as arriving from the direction of the real object 1) at a volume corresponding to the distance between the real object 1 and the user (Step 108).

As a result, primary information of a real object 1 that is present within the predetermined distance d from the user and matches the user preference is heard from the headphones 20. At this time, the primary information is heard from a direction corresponding to the direction of the face with respect to the real object 1 at a volume corresponding to the distance between the user and the real object 1 (see FIG. 4).

For example, simple information (primary information) such as "there is CD Shop A" (A: shop name) is heard from a direction corresponding to the direction of the face of the user with respect to CD Shop A at a volume corresponding to a distance between CD Shop A and the user. Moreover, simple information (primary information) such as "there is Tokyo Tower" is heard from a direction corresponding to the direction of the face of the user with respect to Tokyo Tower at a volume corresponding to a distance between Tokyo Tower and the user. As a result, the user can recognize which of the real objects 1 such as a shop and a building that matches a user preference is present in an area where the user is in. The user can also intuitively recognize a direction and distance of the real object 1 from him/herself.

It should be noted that when the user turns his/her head and changes the direction of the face while primary information of the real object 1 is being reproduced, the position of the sound source of the real object 1 is adjusted such that the primary information of the real object 1 is heard from a direction in which the real object 1 is present. For example, when the user faces the left-hand direction at a time primary information of the real object 1 is heard from the left-hand direction, the primary information of the real object 1 is then heard from the front direction.

When primary information is reproduced while the cellular phone 10 is executing a main task such as music reproduction and video reproduction, the controller 11 may synthesize audio of the primary information with audio of the music or video and output it. In this case, the controller 11 may control sound signals such that a volume of the music or video becomes small.

After controlling the output of sound signals with respect to the headphones 20, the controller 11 next controls the output of sound signals such that secondary information (specific information) of the real object 1 is heard from the headphones 20 based on a user action with respect to the primary information (Step 109).

<Processing of Controller 11 when Secondary Information is Heard from Headphones 20 According to User Action with Respect to Primary Information>

Next, processing of the controller 11 that is carried out when secondary information is heard from the headphones 20 according to a user action with respect to primary information will be specifically described using 3 examples.

Figure 6:
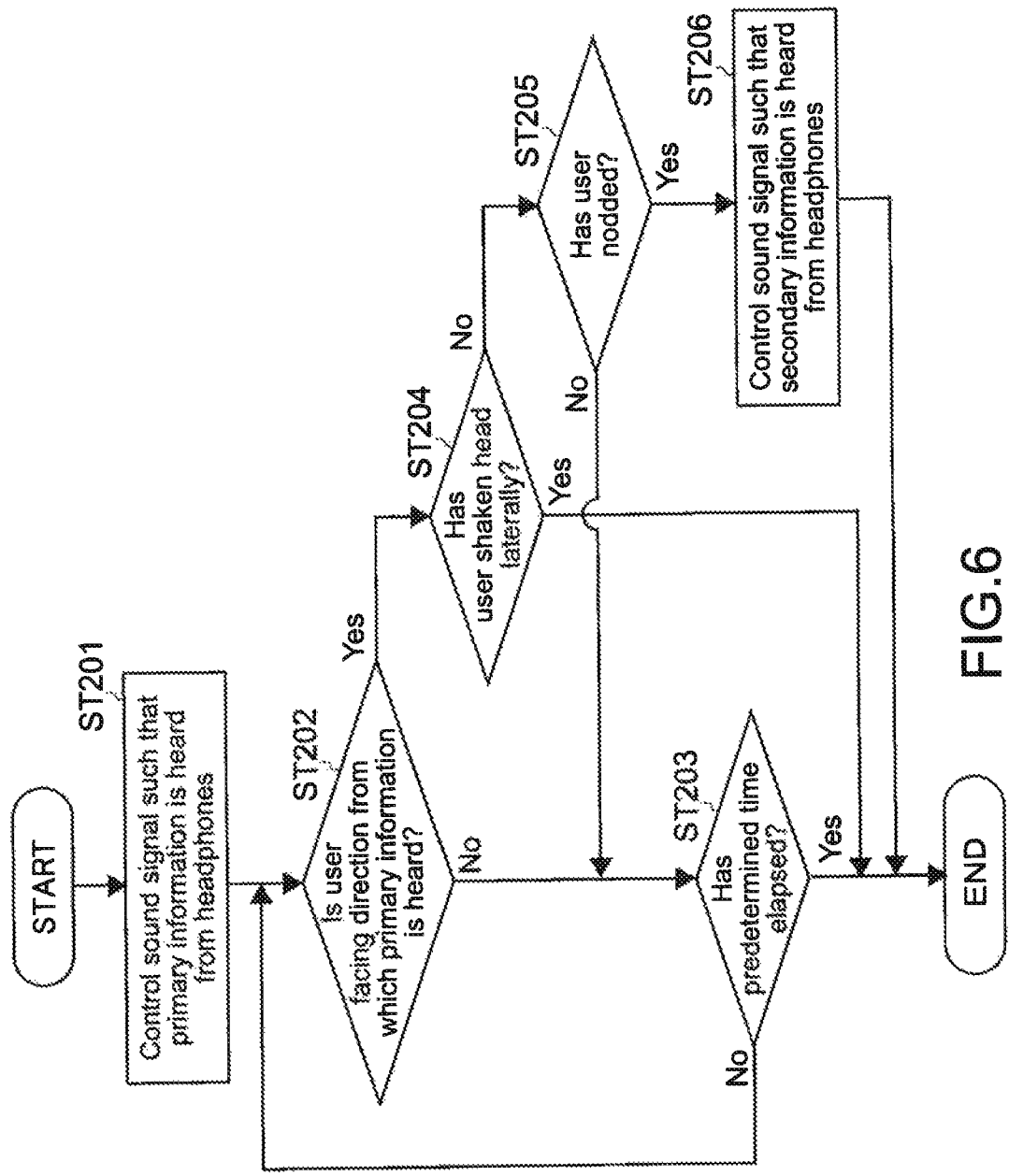
FIG. 6 is a flowchart showing an example of processing of the controller that is carried out when secondary information is heard from headphones in accordance with a user action with respect to primary information.

FIG. 6 is a flowchart showing an example of the processing of the controller 11 that is carried out when secondary information is heard from the headphones 20 according to a user action with respect to primary information.

As shown in FIG. 6, upon controlling sound signals such that primary information of a real object 1 is heard from the headphones 20 (Step 201) (see Step 108), the controller 11 next judges whether the user is facing a direction from which the primary information is heard (Step 202). Whether the user is facing the direction from which the primary information is heard can be judged based on the information on a direction from the direction sensor.

When the user is facing the direction from which the primary information is heard (YES in Step 202), the controller 11 judges whether the user has shaken his/her head laterally (Step 204). In this case, the controller 11 judges whether the user has shaken his/her head laterally based on a signal from the motion sensor of the sensor unit 30 provided in the headphones 20.

When the user has not shaken his/her head laterally (NO in Step 204), the controller 11 judges whether the user has nodded (Step 205). In this case, the controller 11 judges whether the user has nodded based on a signal from the motion sensor of the sensor unit 30 provided in the headphones 20.

When the user is not facing the direction from which the primary information is heard in Step 202 (NO in Step 202), the controller 11 advances to Step 203. Similarly, when the user is facing the direction from which the primary information is heard but is not shaking his/her head laterally nor nodding (NO in Step 205), the controller 11 advances to Step 203.

In Step 203, the controller 11 judges whether a predetermined time has elapsed since an end of reproduction of the primary information (Step 203). The time is, for example, about 5 to 10 seconds.

When a predetermined time has not elapsed since the end of reproduction of the primary information (NO in Step 203), the controller 11 returns to Step 202 and judges whether the user is facing the direction from which the primary information is heard.

When the user faces the direction from which the primary information is heard and shakes his/her head laterally before a predetermined time elapses (YES in Step 204), the controller 11 ends the processing without reproducing the secondary information, of the real object 1. As a result, the user can cancel the reproduction of the secondary information by facing the direction from which the primary information of the real object 1 is heard and shaking his/her head laterally.

For example, when the user faces, at a time primary information of "there is CD Shop A" is heard, a direction from which the primary information is heard (direction in which CD shop is present) and shakes his/her head laterally, reproduction of secondary information (specific information) of the CD shop is canceled. Similarly, when the user faces, at a time primary information of "there is Tokyo Tower" is heard, a direction from which the primary information is heard (direction in which Tokyo Tower is present) and shakes his/her head laterally, reproduction of secondary information (specific information) of Tokyo Tower is canceled.

When the user faces the direction from which the primary information is heard and nods before a predetermined time elapses (YES in Step 205), the controller 11 controls sound signals such that secondary information of the real object 1 is heard from the headphones 20 (Step 206). In this case, the controller 11 controls the output of sound signals such that the secondary information of the real object 1 is heard from a direction corresponding to the direction of the face with respect to the real object 1 at a volume corresponding to the distance between the real object 1 and the user.

For example, when the user faces, at a time primary information of "there is CD Shop A" is heard, a direction from which the primary information is heard (direction in which CD shop is present) and nods, reproduction of secondary information (specific information) of the CD shop is started. In this case, specific information such as information on a recommended CD and opening hours of CD Shop A is reproduced as the secondary information.

Similarly, when the user faces, at a time primary information of "there is Tokyo Tower" is heard, a direction from which the primary information is heard (direction in which Tokyo Tower is present) and nods, secondary information (specific information) of Tokyo Tower is reproduced. In this case, specific information such as the height of Tokyo Tower, the history of Tokyo Tower, and the hours during which Tokyo Tower is lightened up is reproduced as the secondary information.

As described above, the user can grasp specific information on the real object 1 by facing the direction from which the primary information of the real object 1 is heard and nodding.

It should be noted that when the user turns his/her head and changes the direction of the face while secondary information of the real object 1 is being reproduced, the position of the sound source is adjusted such that the secondary information of the real object 1 is heard from a direction in which the real object 1 is present. For example, when the user faces the direction of the real object 1 and nods and turns the head leftwardly after that to change the direction of the face 90°, the secondary information of the real object 1 is heard from the right-hand direction.

When secondary information is reproduced while the cellular phone 10 is executing a main task such as music reproduction and video reproduction, the controller 11 may synthesize audio of the secondary information with audio of the music or video and output it. In this case, the controller 11 may control sound signals such that a volume of the music or video becomes small.

Further, reproduction of the secondary information may be stopped as the user shakes his/her head laterally while the secondary information is being reproduced.

When the user faces the direction from which the primary information is heard and a predetermined time elapses without the user shaking his/her head laterally or nodding (YES in Step 203), the controller 11 ends the processing without reproducing the secondary information. In other words, when the user does not carry out any action with respect to the primary information, the controller 11 ends the processing without reproducing the secondary information. As a result, the user can cancel the reproduction of the secondary information by not carrying out any action with respect to the primary information.

Next, processing of the controller 11 that is carried out when secondary information is heard from the headphones 20 according to a user action with respect to primary information will be described using another example.

Figure 7:
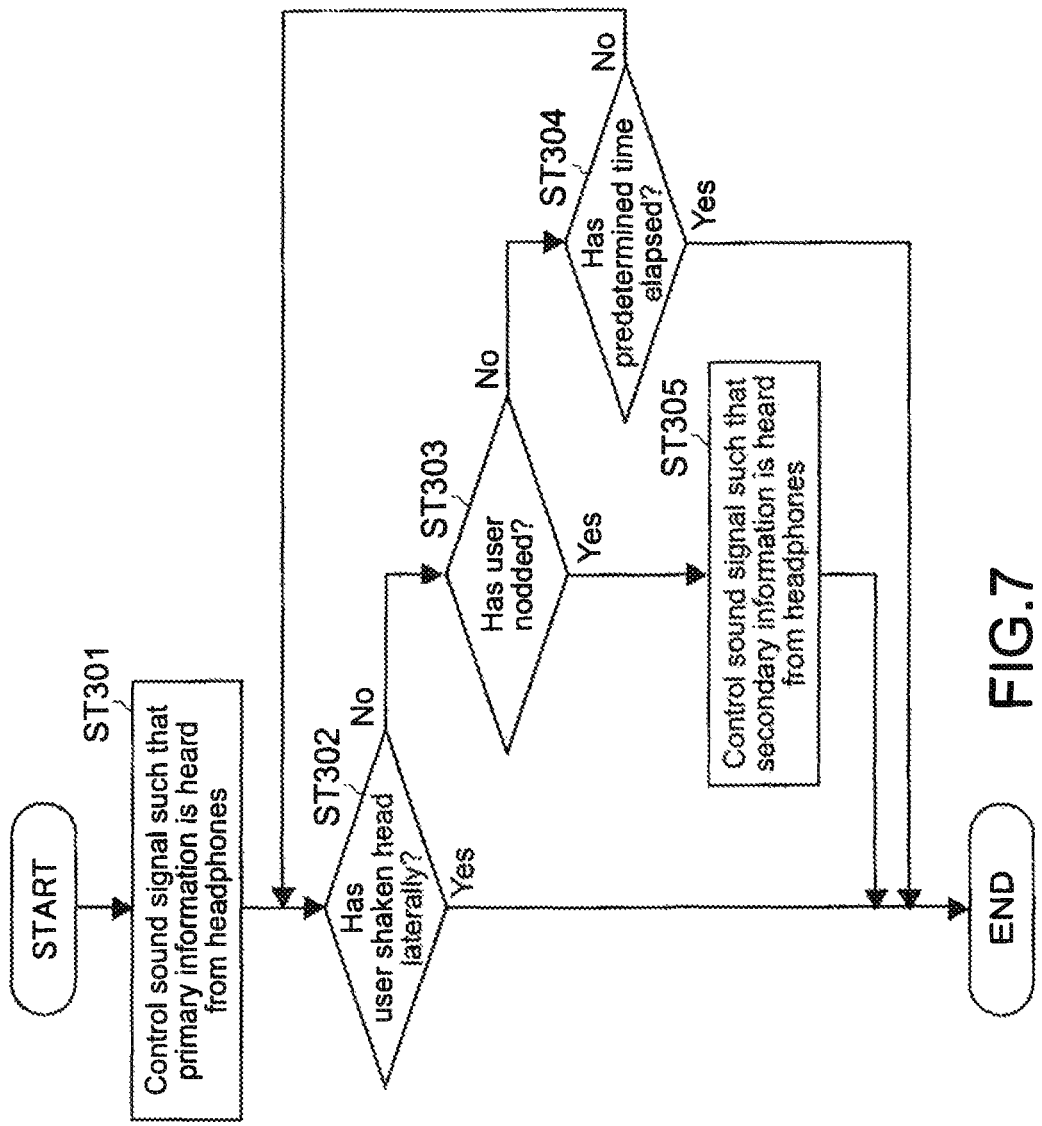
FIG. 7 is a flowchart showing another example of the processing of the controller that is carried out when secondary information is heard from headphones in accordance with a user action with respect to primary information.

FIG. 7 is a flowchart showing another example of the processing of the controller 11 that is carried out when secondary information is heard from the headphones 20 according to a user action with respect to primary information.

In the example of FIG. 6 described above, the user selects whether to reproduce secondary information of the real object 1 by shaking his/her head laterally or nodding while facing the direction from which the primary information of the real object 1 is heard. On the other hand, the example of FIG. 7 is different from that of FIG. 6 in that the user can face any direction when selecting whether to reproduce secondary information of a real object 1 by shaking his/her head laterally or nodding.

As shown in FIG. 7, upon controlling sound signals such that primary information of a real object 1 is heard from the headphones 20 (Step 301) (see Step 108), the controller 11 next judges whether the user has shaken his/her head laterally (Step 302).

When the user has not shaken his/her head laterally (NO in Step 302), the controller 11 judges whether the user has nodded (Step 303). When the user has not nodded (NO in Step 303), the controller 11 judges whether a predetermined time has elapsed since an end of reproduction of the primary information of the real object 1 (Step 304). The predetermined time is, for example, about 5 to 10 seconds as in the case of the example shown in FIG. 6.

When the predetermined time has not elapsed since the end of reproduction of the primary information of the real object 1 (NO in Step 304), the controller 11 returns to Step 302 and again judges whether the user has shaken his/her head laterally.

When the user shakes his/her head laterally before the predetermined time elapses since the end of reproduction of the primary information (YES in Step 302), the controller 11 ends the processing without reproducing secondary information of the real object 1. As a result, the user can cancel the reproduction of the secondary information by shaking his/her head laterally after the primary information is reproduced.

When the user nods before the predetermined time elapses since the end of reproduction of the primary information (YES in Step 303), the controller 11 controls sound signals such that the secondary information of the real object 1 is heard from the headphones 20. In this case, the controller 11 controls the output of sound signals such that the secondary information of the real object 1 is heard from a direction corresponding to the direction of the face with respect to the real object 1 at a volume corresponding to the distance between the real object 1 and the user. As a result, the user can start the reproduction of the secondary information by nodding after the primary information is reproduced. The controller 11 may stop the reproduction of the secondary information when the user shakes his/her head laterally while the secondary information is being reproduced.

When the predetermined time has elapsed without the user shaking his/her head laterally or nodding (YES in Step 304), the controller 11 ends the processing without reproducing the secondary information. As a result, the user can cancel the reproduction of the secondary information by not carrying out any action with respect to the primary information.

Next, the processing of the controller 11 that is carried out when secondary information is heard from the headphones 20 according to a user action with respect to primary information will be described using still another example.

Figure 8:
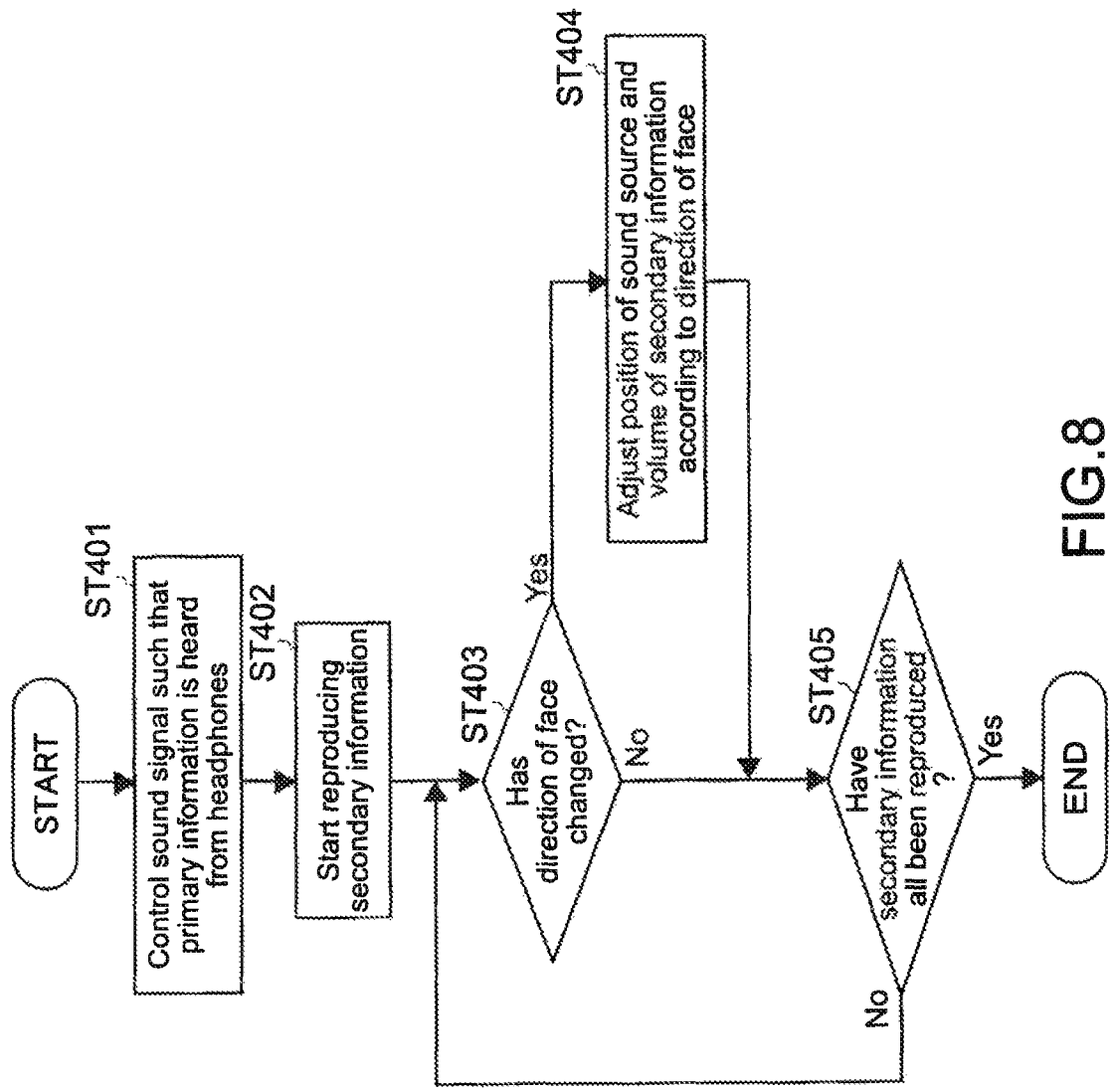
FIG. 8 is a flowchart showing still another example of the processing of the controller that is carried out when secondary information is heard from headphones in accordance with a user action with respect to primary information.

FIG. 8 is a flowchart showing still another example of the processing of the controller 11 that is carried out when secondary information is heard from the headphones 20 according no a user action with respect to primary information.

As shown in FIG. 8, upon controlling sound signals such that primary information of a real object 1 is heard from the headphones 20 (Step 401) (see Step 108), the controller 11 next starts reproduction of secondary information of the real object 1 (Step 402). In this case, the controller 11 controls the output of sound signals such that the secondary information of the real object 1 is heard from a direction corresponding to the direction of the face with respect to the real object 1 at a volume corresponding to the distance between the real object 1 and the user.

Next, the controller 11 judges whether the direction of the face of the user with respect to the real object 1 has changed (Step 403). In this case, the controller 11 judges whether the direction of the face of the user has changed based on the information on a direction from the direction sensor.

When the user turns his/her head to change the direction of the face (YES in Step 403), the controller 11 adjusts a position of a sound source of the real object 1 and the volume of the secondary information according to the direction of the face of the user with respect to the real object 1. At this time, the controller 11 controls the output of sound signals such that the volume of the secondary information becomes larger as the direction of the face of the user approaches the direction from which the primary information is heard (direction from which secondary information is heard).

When the direction of the face of the user has not changed (NO in Step 403) and the position of the sound source of the real object 1 and the volume of the secondary information have been adjusted (Step 404), the controller 11 advances to Step 405. In Step 405, the controller 11 judges whether all of the secondary information have been reproduced.

When there is still secondary information to be reproduced (NO in Step 405), the controller 11 returns to Step 403 and again judges whether the direction of the face has changed. On the other hand, when all of the secondary information have been reproduced (YES in Step 405), the controller 11 ends the processing.

By the processing shown in FIG. 8, the user can adjust the volume of the secondary information to become larger by facing the direction from which the secondary information is heard (direction in which real object 1 is present).

In the descriptions on the first embodiment, although the cellular phone 10 has been taken as an example of the sound control apparatus body 10, the sound control apparatus body 10 is not limited thereto. The sound control apparatus body 10 may be a portable music player, a PDA (Personal Digital Assistance), a tablet PC (Personal Computer), a laptop PC, or the like.

Second Embodiment

Next, a second embodiment of the present disclosure will be described. In the first embodiment above, the case where primary and secondary information on a real object 1 such as a shop and a building present in space are heard from a direction corresponding to a direction of a face of a user with respect to the real object 1 has been described. On the other hand, the second embodiment is different from the first embodiment above in that a virtual object 2 such as an application program is virtually arranged in space and primary and secondary information on the virtual object 2 are heard from a direction in which the virtual object 2 is provided. Therefore, that point will mainly be described.

[Overall Structure of Sound Control Apparatus 200 and Structures of Components]

Figure 9:
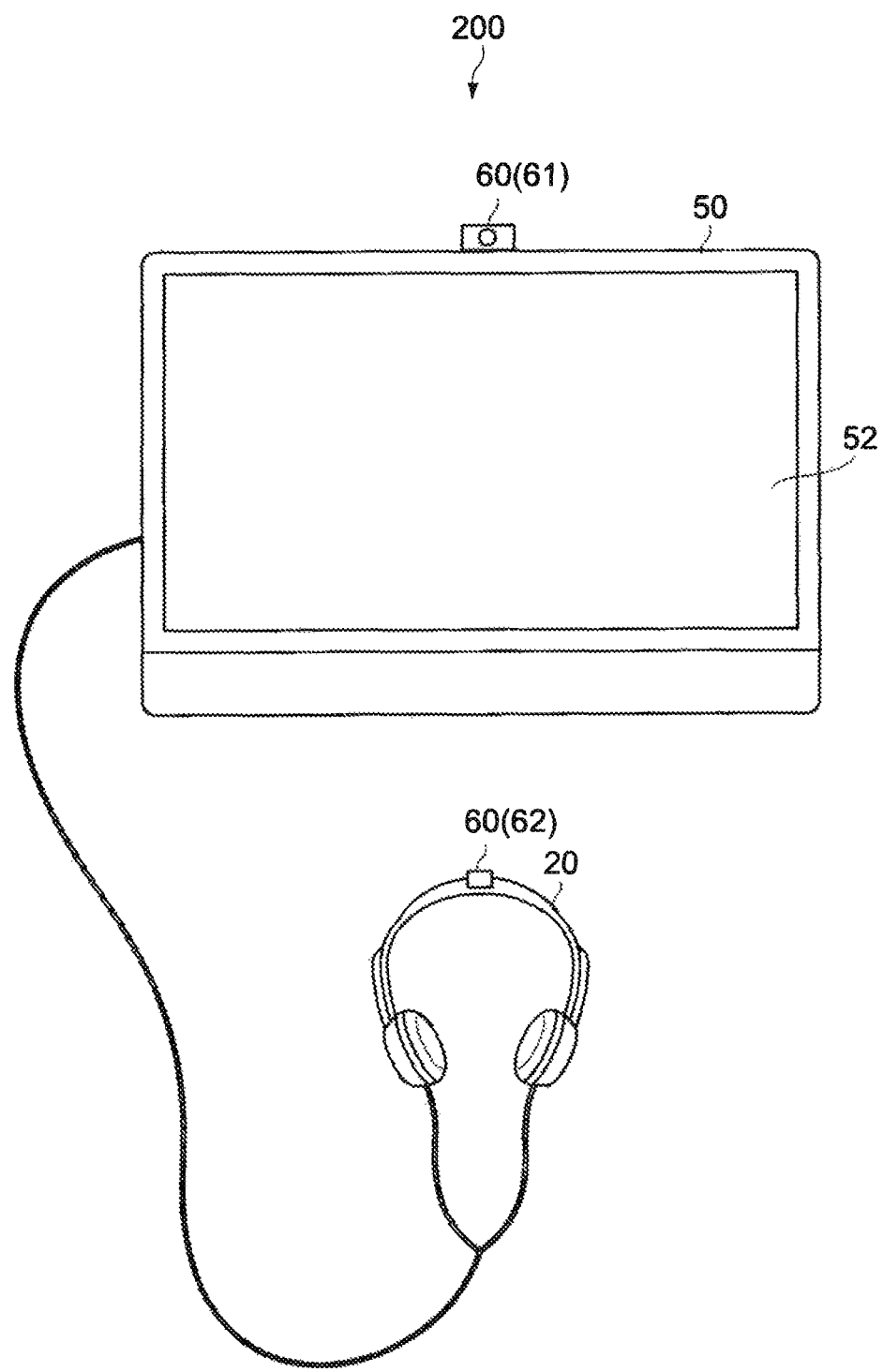
FIG. 9 is a diagram showing a sound control apparatus according to another embodiment of the present disclosure.
Figure 10:
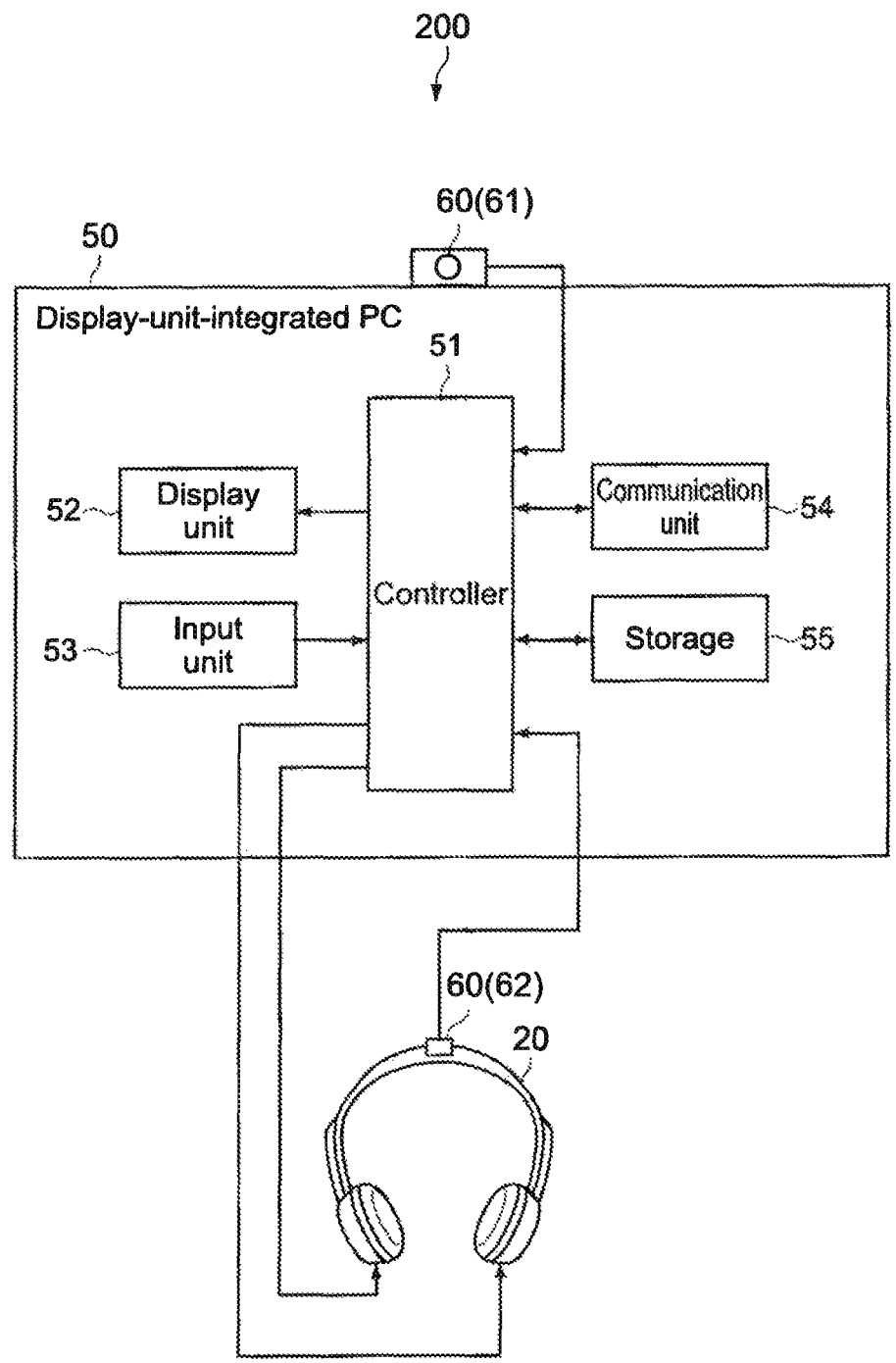
FIG. 10 is a block diagram showing an electrical structure of the sound control apparatus according to the another embodiment.

FIG. 9 is a diagram showing a sound control apparatus 200 according to a second embodiment of the present disclosure. FIG. 10 is a block diagram showing an electrical structure of the sound control apparatus 200 according to the second embodiment.

As shown in the figures, the sound control apparatus 200 of the second embodiment includes a sound control apparatus body 50 (display-unit-integrated PC 50), headphones 20 connected to the sound control apparatus body 50, and a sensor unit 60. The sensor unit 60 includes a first sensor unit 61 provided on the sound control apparatus body 50 and a second sensor unit 62 provided on the headphones 20. In the second embodiment, the display-unit-integrated PC 50 is taken as an example of the sound control apparatus body 50.

The display-unit-integrated PC 50 includes a controller 51, a display unit 52, an input unit 53, a communication unit 54, and a storage 55.

The display unit 52 is constituted of, for example, a liquid crystal display or an EL (Electro-Luminescence) display. The input unit 53 is constituted of a keyboard, a mouse, a touch sensor, or the like and inputs instructions from a user and outputs them to the controller 51.

The storage 55 includes a volatile memory (e.g., RAM (Random Access Memory) and a nonvolatile memory (e.g., ROM (Read Only Memory). The storage 55 includes an auxiliary storage apparatus such as an HDD (Hard Disk Drive) and an SDD (Solid State Drive). The ROM, the HDD, and the SOD fixedly store various programs and various types of data requisite for processing of the controller 51. The programs may be read out from a removable recording medium (i.e., a non-transitory, computer readable storage medium) such as an optical disc and a semiconductor memory.

The controller 51 executes various operations based on the programs stored in the storage 55. The communication unit 54 transmits and receives various types of data such as an email and web data under control of the controller 51.

The first sensor unit 61 constituting a part of the sensor unit 60 is constituted of an image pickup device such as a CCD (Charge Coupled Device) sensor and a CMOS (Complementary Metal Oxide Semiconductor) sensor. Signals output from the first sensor unit 61 are A/D-converted and input to the controller 51. The controller 51 judges a direction of a face of a user based on an image taken by the first sensor unit 61.

The second sensor unit 62 constituting a part of the sensor unit 60 is constituted of a motion sensor such as an acceleration sensor and an angular velocity sensor. Signals output from the second sensor unit 62 are A/D-converted and input to the controller 51. The controller 51 judges a movement of a head of a user based on the signals output from the second sensor unit 62.

Although the display-unit-integrated PC 50 and the headphones 20 are connected by wires in FIGS. 9 and 10, the display-unit-integrated PC 50 and the headphones 20 may communicate wirelessly.

[Descriptions on Operations]

Figure 11:
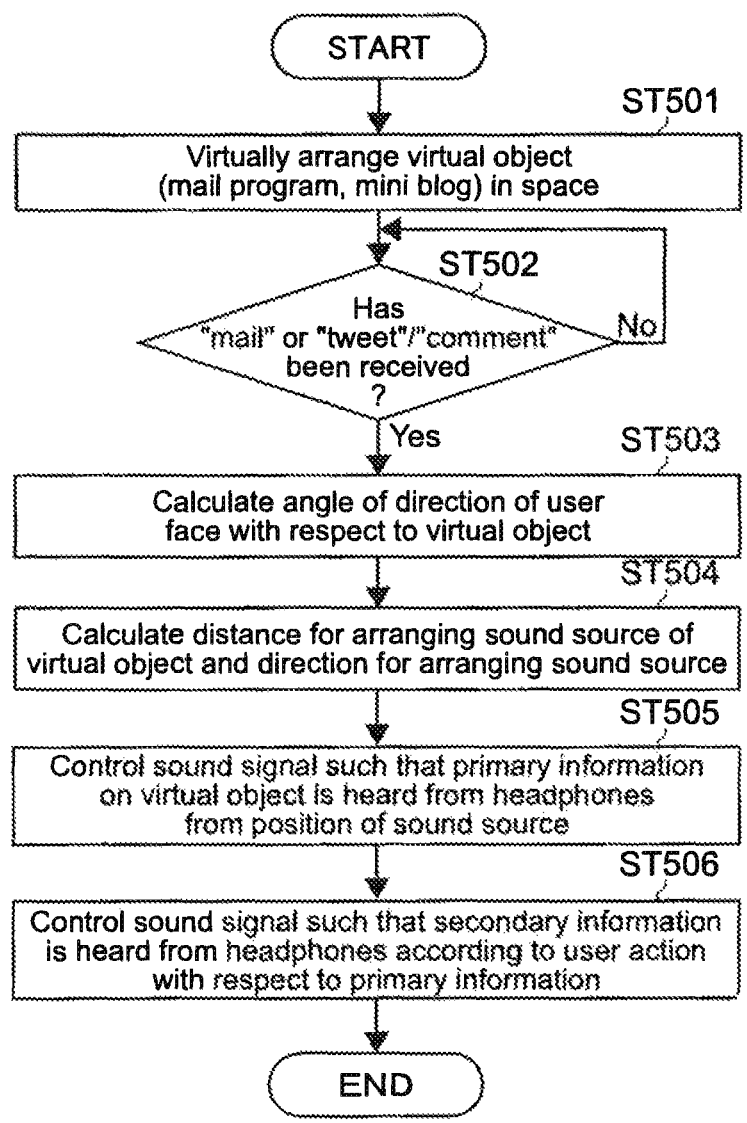
FIG. 11 is a flowchart showing processing of a controller of a display-unit-integrated PC according to the another embodiment.
Figure 12:
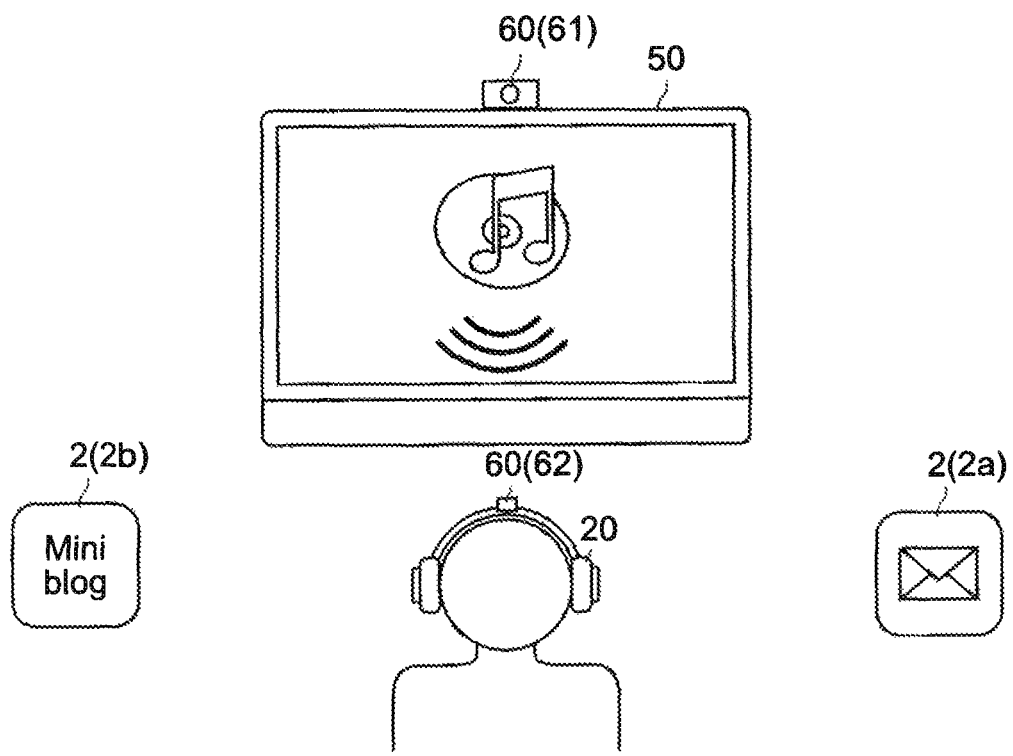
FIG. 12 is a complementary diagram for explaining the processing shown in FIG. 11, the diagram showing virtual objects virtually arranged in space.

Next, processing of the controller 51 of the display-unit-integrated PC 50 of this embodiment will be described. FIG. 11 is a flowchart showing the processing of the controller 51 of the display-unit-integrated PC 50 of this embodiment. FIG. 12 is a complementary diagram for explaining the processing shown in FIG. 11, the diagram showing virtual objects 2 virtually arranged (i.e., positioned) in space.

As shown in FIG. 11, the controller 51 first virtually arranges virtual objects 2 in space (Step 501). FIG. 12 shows an example of a case where a mail program 2a as the virtual object 2 is arranged on the right-hand side of a user (right-hand side of headphones 20) and a mini blog 2b as the virtual object 2 is arranged on the left-hand side of the user (left-hand side of headphones 20).

As shown in FIG. 12, when the virtual objects 2 are arranged in space, the controller 51 is executing a main task such as music reproduction and video reproduction. At this time, the controller 51 controls sound signals of the headphones 20 such that audio of music and video are heard from a direction corresponding to a direction of a face of the user.

After arranging the virtual objects 2 in space, the controller 51 judges whether a mail of the mail program 2a, tweets and comments of the mini blog 2b, and the like have been received via the communication unit 54 (Step 502).

When those pieces of information are received via the communication unit 54 (YES in Step 502), the controller 51 next calculates an angle of a direction of the face of the user with respect to the virtual object 2 (Step 503). In this case, the controller 51 judges the direction of the face of the user with respect to the screen from an image taken by the first sensor unit 61 (image pickup device). Then, the controller 51 judges the direction of the face of the user with respect to the virtual object 2 based on the direction of the face of the user with respect to the screen.

Next, the controller 51 calculates a distance and direction for arranging a sound source of the virtual object 2 (Step 504). The direction for arranging the sound source of the virtual object 2 is determined based on the direction of the face of the user with respect to the virtual object 2.

Subsequently, the controller 51 controls sound signals such that primary information on the virtual object 2 is heard from the headphones 20 from the position of the sound source of the virtual object 2 (Step 505). It should be noted that in this case, the controller 51 synthesizes audio of the primary information with audio of music, video, and the like (audio of main task) and outputs it. The controller 51 may execute processing of turning down the volume of the main task during reproduction of the primary information.

For example, a case where the virtual object 2 is the mail program 2a will be described. In this case, sound signals are controlled such chat simple information such as "mail received from . . . " is heard as the primary information of the virtual object 2 from a direction in which the mail program 2a is arranged. Alternatively, sound signals may be controlled such that a simple alert sound such as "beep" is heard as the primary information from the direction in which the mail program 2a is arranged.

Next, a case where the virtual object 2 is the mini blog 2b will be described. In this case, sound signals are controlled such that simple information such as "tweet from . . . " or "comment from . . . " is heard as the primary information of the virtual object 2 from a direction in which the mini blog 2b is arranged. Alternatively, sound signals may be controlled such that a simple alert sound such as "beep" is heard as the primary information from the direction in which the mini blog 2b is arranged.

It should be noted that when the user turns his/her head to change the direction of the face while the primary information of the virtual object 2 is being reproduced, the position of the sound source of the virtual object 2 is adjusted such that the primary information is heard from a direction in which the virtual object 2 is present. For example, when the user faces the left-hand direction at a time the primary information of the virtual object 2 is heard from the left-hand side, the primary information of the virtual object 2 is then heard from the front direction.

Next, the controller 51 controls sound signals such that secondary information (specific information) is heard from the headphones 20 according to a user action with respect to the primary information (simple information) (Step 506).

<Processing of Controller 51 when Secondary Information is Heard from Headphones 20 According to User Action with Respect to Primary Information>

Next, processing of the controller 51 that is carried out when secondary information is heard from the headphones 20 according to a user action with respect to primary information will be described. The processing in this case is typically the same as the 3 examples of the first embodiment described with reference to FIGS. 6 to 8 except that the object arranged in space is not the real object 1 and is the virtual object 2. Therefore, the processing in this case will be described with reference to FIGS. 6 to 8.

Referring to FIG. 6, when the user faces the direction from which the primary information is heard (YES in Step 202) and shakes his/her head laterally (YES in Step 204) before a predetermined time elapses since the end of reproduction of the primary information (NO in Step 203), the controller 51 ends the processing without reproducing the secondary information. As a result, the user can cancel the reproduction of the secondary information by facing the direction from which the primary information is heard and shaking his/her head laterally.

Whether the user is facing the direction from which the primary information is heard is judged based on the direction of the face of the user that has been judged based on an image taken by the first sensor unit 61 (image pickup device). Further, whether the user has shaken his/her head laterally is judged based on a signal detected by the second sensor unit 62 (motion sensor).

For example, when the user faces, at a time primary information of "mail received from . . . " is heard, a direction from which the primary information is heard (direction in which mail program 2a is present) and shakes his/her head laterally, reproduction of secondary information (specific information) is canceled. Similarly, when the user faces, at a time primary information of "tweet from . . . " or "comment from . . . " is heard, a direction from which the primary information is heard (direction in which mini blog 2b is present) and shakes his/her head laterally, reproduction of secondary information (specific information) is canceled.

When the user faces the direction from which the primary information is heard (YES in Step 202) and nods (YES in Step 205) before a predetermined time elapses since the end of reproduction of the primary information (NO in Step 203), the controller 51 controls the output of sound signals such that secondary information is heard from a direction corresponding to the direction of the face of the user with respect to the virtual object 2 (Step 206). Whether the user has nodded is judged based on a signal detected by the second sensor unit 62 (motion sensor).

It should be noted that in this case, the controller 51 synthesizes audio of the secondary information with audio of music, video, and the like (audio of main task) and outputs it. The controller 51 may execute processing of turning down the volume of the main task during reproduction of the secondary information.

For example, when the user faces, at a time primary information of "mail received from . . . " is heard, a direction from which the primary information is heard (direction in which mail program 2a is present) and nods, reproduction of secondary information (specific information) is started. In this case, the controller 51 reproduces a mail content as the secondary information.

Similarly, when the user faces, at a time primary information of "tweet from . . . " or "comment from . . . " is heard, a direction from which the primary information is heard (direction in which mini blog 2b is present) and nods, reproduction of the secondary information (specific information) is started. In this case, the controller 51 reproduces a content of the tweet or comment as the secondary information. A TTH (Text To Speech) technique is used as a method of converting a text content of mails, tweets, comments, and the like into audio.

As described above, the user can grasp secondary information as a content more specific than the primary information by facing the direction from which the primary information is heard (direction in which virtual object 2 is present) and nodding.

It should be noted that when the user turns his/her head and changes the direction of the face while secondary information of the real object 1 is being reproduced, the position of the sound source is adjusted such that the secondary information is heard from a direction in which the virtual object 2 is present. For example, when the user faces the direction of the virtual object 2 and nods and turns the head leftwardly after that to change the direction of the face 90°, the secondary information is heard from the right-hand direction.

Further, reproduction of the secondary information may be stopped as the user shakes his/her head laterally while the secondary information is being reproduced.

When the user faces the direction from which the primary information is heard and a predetermined time elapses without the user shaking his/her head laterally or nodding (YES in Step 203), the controller 51 ends the processing without reproducing the secondary information.

In other words, when the user does not carry out any action with respect to the primary information, the controller 51 ends the processing without reproducing the secondary information. As a result, the user can cancel the reproduction of the secondary information by not carrying out any action with respect to the primary information.

Referring to FIG. 7, when the user shakes his/her head laterally (YES in Step 302) before a predetermined time elapses since the end of reproduction of the primary information (NO in Step 304), the controller 51 ends the processing without reproducing the secondary information such as a content of a mail, tweet, and comment. As a result, the user can cancel the reproduction of the secondary information by shaking his/her head laterally (irrespective of face direction) after the primary information is reproduced.

When the user nods (YES in Step 303) before a predetermined time elapses (NO in Step 304), the controller 51 controls sound signals such that the secondary information such as a content of a mail, tweet, and comment is heard from the headphones 20 (Step 305). In this case, the controller 51 controls the output of sound signals such that the secondary information is heard from a direction corresponding to the direction of the face with respect to the virtual object 2.

By the processing as described above, the user can start reproduction of the secondary information by nodding (irrespective of face direction) after the primary information is reproduced. The controller 51 may stop the reproduction of the secondary information when the user shakes his/her head laterally while the secondary information is being reproduced.

When the predetermined time has elapsed without the user shaking his/her head laterally or nodding (YES in Step 304), the controller 51 ends the processing without reproducing the secondary information. As a result, the user can cancel the reproduction of the secondary information by not carrying out any action with respect to the primary information.

Referring to FIG. 8, when the user faces the direction from which the primary information is heard (direction from which secondary information is heard) after reproduction of the secondary information is started (YES in Step 403), the secondary information is heard from a direction corresponding to the direction of the face of the user with respect to the virtual object 2, and the volume of the secondary information becomes larger as the direction of the face approaches the direction of the virtual object 2 (Step 404).

Figure 13:
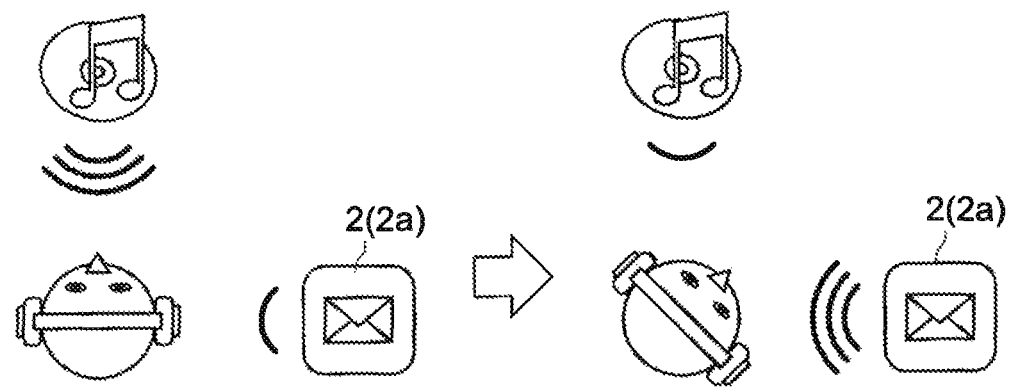
FIG. 13 is a diagram showing a state where a user faces, after listening to primary information on a mail program, a direction from which the primary information is heard.

FIG. 13 shows a state where the user faces, after listening to primary information on the mail program 2a, a direction from which the primary information is heard. As shown on the left-hand side of FIG. 13, when audio of a main task (audio of music, etc.) is heard from the front side, primary information, of "mail received from . . . " is heard from a position of a sound source of the mail program 2a arranged on the right-hand side of the user. Next, a case where the user turns his/her head to face a direction from which the primary information is heard as shown on the right-hand side of FIG. 13 will be described.

In this case, sound signals are controlled such that the secondary information such as a mail content is heard from a direction corresponding to the direction of the face of the user with respect to the mail program 2a. Similarly, sound signals are controlled such that audio of a main task (audio of music) is heard from a direction corresponding to the direction of the face of the user. Moreover, in this case, sound signals are controlled such that the volume of the secondary information becomes larger and the volume of the main task becomes smaller as the direction of the face approaches the direction from which the primary information is heard (direction from which secondary information is heard).

By the processing shown in FIG. 8, the user can turn up the volume of the secondary information by facing the direction from which the secondary information is heard (direction in which virtual object 2 is present).

Modified Example of Second Embodiment

Next, a modified example of the second embodiment will be described. As described above, in the second embodiment, application programs such as the mail program 2a and the mini blog 2b are arranged in space as the virtual objects 2. Then, the controller 51 controls sound signals such that primary and secondary information are heard from directions of the virtual objects 2. Since the primary and secondary information are heard from certain directions, the user already knows the directions in which the application programs such as the mail program 2a and the mini blog 2b (virtual object 2) are arranged. Such a relationship is used in the modified example of the second embodiment.

Figure 14:
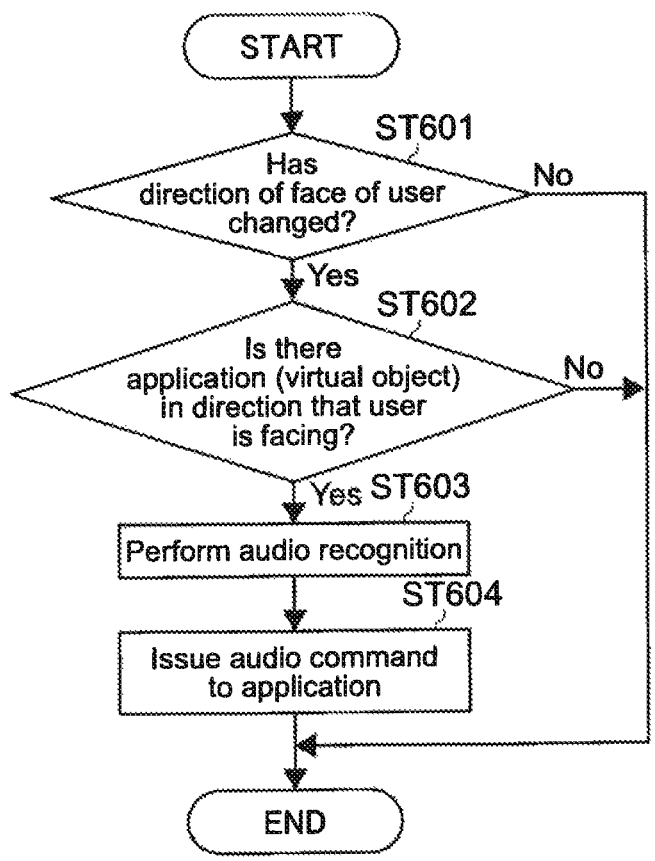
FIG. 14 is a flowchart showing processing of a sound control apparatus according to still another embodiment of the present disclosure.
Figure 15:
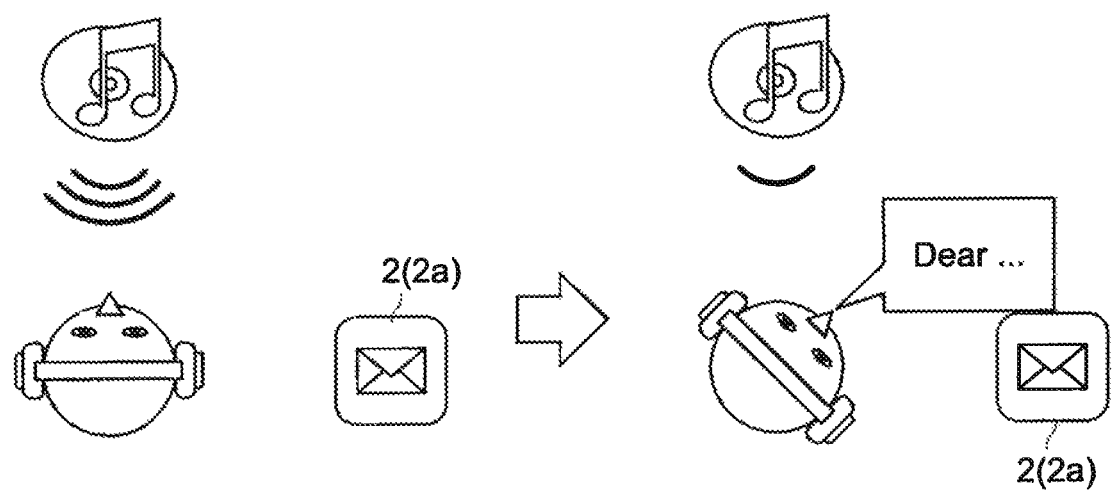
FIG. 15 is a complementary diagram for explaining the processing shown in FIG. 14, the diagram showing a state where the user utters a voice while facing a direction in which a virtual object (mail program) exists.

FIG. 14 is a flowchart showing processing according to the modified example of the second embodiment. FIG. 15 is a complementary diagram for explaining the processing shown in FIG. 14, the diagram showing a state where the user utters a voice while facing a direction in which a virtual object 2 (mail program 2a) is present.

As shown in FIG. 15, the controller 51 is executing a main task such as music reproduction and video reproduction. Referring to FIG. 14, the controller 51 judges whether the direction of the face of the user has changed based on an image taken by the first sensor unit 61 (image pickup device) (Step 601).

When the direction of the face of the user has changed (YES in Step 601), the controller 51 judges whether an application program such as the mail program 2a and the mini blog 2b (virtual object 2) is arranged in the direction in which the user is facing (Step 602). In this case, the controller 51 judges that there is an application program (virtual object 2) in the direction in which the user is facing when there is an application program within the range of, for example, ±45° from the front direction of the face of the user.

It should be noted that when the direction of the face of the user has changed, the controller 51 controls the position, of the sound source such that audio of music and video (audio of main task) is heard from a direction corresponding to the direction of the face of the user (see left- and right-hand sides of FIG. 15).

When judged YES in Step 602 (YES in Step 602), the controller 51 executes audio recognition processing (Step 603). Voices uttered by the user are collected by a microphone added to the headphones 20, for example.

On the right-hand side of FIG. 15, an example of a case where the user utters "Dear . . . " while facing the direction in which the mail program 2a (virtual object 2) is present and utters a content of a mail that is to be transmitted to . . . is shown. It should be noted that since primary ("mail received from . . . ") and secondary information (mail content) are heard from the right-hand side, the user already knows that the mail program 2a is arranged on the right-hand side of the user.

After executing the audio recognition processing, the controller 51 issues an audio command to the application program. As a result, the content of "Dear . . . " uttered by the user is written in a mail text.

Further, when the user utters a content to be written in the mini blog 2b (tweet, comment, etc.) while facing the direction in which the mini blog 2b is present, the controller 51 recognizes the audio. Then, the content uttered by the user with respect to the mini blog 2b is written in the mini blog 2b.

By the processing as described above, the user can write contents of a mail and mini blog by utterance without inhibiting the main task.

Although the display-unit-integrated PC 50 has been taken as an example of the sound control apparatus body 50 in the descriptions on the second embodiment and the modified example of the second embodiment, the sound control apparatus body 50 is not limited thereto. The sound control apparatus body 50 may be a desktop PC, a laptop PC, a tablet PC, a cellular phone, a portable music player, a PDA (Personal Digital Assistance), or the like.

Modified Examples

The descriptions above have taken the headphones 20 as an example. However, it is also possible to use earphones (sound output unit) in place of the headphones 20.

In the descriptions above, the direction sensor, the motion sensor, and the like provided in the headphones 20 have been taken as examples of sensors that detect user actions with respect to primary information. However, the sensor for detecting a user action with respect to primary information is not limited thereto.

For example, a microphone may be used as the sensor for detecting a user action with respect to primary information. The microphone is provided in the sound control apparatus body 10 or 50 or the headphones 20, for example.

In this case, for example, when primary information such as "there is a shop" and "mail received" is heard, the user utters a voice such as "yes" or "no" to the microphone as an action with respect to the primary information. When judged that the voice of "yes" has been uttered, the controller 11 or 51 may output, as sound signals, secondary information such as specific information on a shop and a mail content. The user may utter "yes" or no while facing a direction in which the object such as a shop and the mail program 2a is present or utter "yes" or "no" regardless of the direction in which the object such as a shop and the mail program 2a is present.

The present disclosure can also take the following structure.

(1) An apparatus, comprising:
   a hardware processor; and
   a storage medium coupled to the processor and storing instructions that, when executed by the processor, cause the apparatus to
      receive a direction signal indicating a first direction in which a head of a user is facing with respect to a fixed direction;

convert the first direction in which the head is facing with respect to the fixed direction into a second direction in which the head is facing with respect to a third direction, connecting the head and an object; and generate an audio signal having characteristics such that a sound generated from the audio signal is perceived by the user as arriving from the third direction.

(2) The apparatus of (1), comprising a direction sensor configured to generate the direction signal.

(3) The apparatus of (1) or (2), wherein the storage medium stores instructions that, when executed by the processor, cause the apparatus to generate the audio signal such that the sound generated from the audio signal indicates first information about the object.

(4) The apparatus of (3), wherein the storage medium stores instructions that, when executed by the processor, cause the apparatus to:

receive a movement signal indicating a movement of the head; and selectively generate the audio signal such that the sound generated from the audio signal indicates second information about the object, based on the movement signal.

(5) The apparatus of (4), wherein the storage medium stores instructions that, when executed by the processor, cause the apparatus to generate the audio signal such that the sound generated from the audio signal indicates the second information when the movement signal indicates the head is nodded.

(6) The apparatus of claim (4), wherein the storage medium stores instructions that, when executed by the processor, cause the apparatus to generate the audio signal such that the sound generated from the audio signal indicates the second information when (i) the movement signal indicates the head is nodded and (ii) the direction signal indicates the head is facing the object.

(7) The apparatus of any one of (4) to (6), comprising a movement sensor configured to generate the movement signal.

(8) The apparatus of any one of (4) to (7), comprising an antenna for receiving radio waves, wherein the storage medium stores instructions that, when executed by the processor, cause the apparatus to receive the first and second information from another apparatus via the antenna.

(9) The apparatus of any one of (1) to (8), wherein the storage medium stores instructions that, when executed by the processor, cause the apparatus to:

receive a head position signal indicating a position of the head;

receive an object position signal indicating a position of the object; and selectively generate the audio signal when a distance between the position of the head and the position of the object is less than or equal to a predetermined threshold distance.

(10) The apparatus of (9), wherein the storage medium stores instructions that, when executed by the processor, cause the apparatus to generate the audio signal such that a volume of the sound generated from the audio signal corresponds to the distance between the position of the head and the position of the of object.

(11) The apparatus of (9) or (10), comprising an antenna for receiving radio waves, wherein the storage medium stores instructions that, when executed by the processor, cause the apparatus to receive the object position signal from another apparatus via the antenna.

(12) The apparatus of any one of (1) to (11), wherein the storage medium stores instructions that, when executed by the processor, cause the apparatus to generate the audio signal such that the sound generated from the audio signal has a higher volume when the head faces the object than when the head does not face the object.

(1) The apparatus of any one of (1) to (12), comprising one of headphones or earphones configured to receive the audio signal and generate the sound from the audio signal.

(14) The apparatus of any one of (1) to (13), wherein:

the object is a virtual object; and the storage medium stores instructions that, when executed by the processor, cause the apparatus to position the virtual object in space.

Although some embodiments have beer described in detail with reference to the accompanying drawings, the present disclosure is not limited to such embodiments. It should be understood by those skilled in the art that various modifications, combinations, sub-combinations and alterations may occur depending on design requirements and other factors insofar as they are within the scope of the appended claims or the equivalents thereof. Further, it should be understood that, as used herein, the indefinite articles "a" and "an" mean "one or more" in open-ended claims containing the transitional phrase "comprising" "including," and/or "having."

What is claimed is:

1. An apparatus, comprising: circuitry configured to
obtain a movement signal indicating a gesture of a user,
determine that a virtual object is present at a position along a relative direction from the user corresponding to a direction that the user faces after the gesture, the virtual object visually depicting an associated application program icon,
determine, based on the direction that the user faces after the gesture, an email or web application that corresponds to the application program icon,
execute audio recognition processing for providing a content of recognized audio to the email or web application, the audio recognition processing including
collecting, via a microphone, voices uttered by the user while facing the direction corresponding to the relative direction along which the virtual object is present,
obtaining a recognition of the utterance made by the user facing the corresponding direction,
issuing, after the determination of the email or web application that corresponds to the application program icon, an audio command, based on the recognized utterance, to the email or web application that corresponds to the application program icon whose associated virtual object is determined to be present at the position along the relative direction from the user corresponding to the direction that the user faces after the gesture, and
providing, to the email or web application and as the content of the recognized audio, a transcription text of the recognized utterance, and
transmit a message via packet communication, through the email or web application,
wherein the transmitted message includes the transcription text that contains the recognized utterance, and the email or web application that corresponds to the application program icon is determined without regard to content of the recognized utterance made by the user.

2. The apparatus of claim 1, further comprising:
a movement sensor configured to generate the movement signal.

3. The apparatus of claim 1, wherein the movement signal further indicates a direction of a face of the user.

4. The apparatus of claim 1, wherein the movement signal further indicates a position of a head of the user.

5. The apparatus of claim 1, wherein the gesture comprises moving a head of the user.

6. The apparatus of claim 1, wherein the gesture comprises changing a direction of a face of the user.

7. The apparatus of claim 1, further comprising
an antenna configured to receive radio waves from another apparatus.

8. The apparatus of claim 1, wherein, upon obtaining the movement signal indicating the gesture of the user, the circuitry is configured to control a volume of a sound, generated in association with a second virtual object that is associated with another application, to be reduced.

9. The apparatus of claim 1, wherein the content of the recognized utterance consists of recognized words spoken by the user.

10. The apparatus of claim 9, wherein the recognized words spoken by the user are provided to the email application to generate an electronic mail having the recognized words as contents.

11. The apparatus of claim 9, wherein the recognized words spoken by the user are provided to the web application to generate an electronic comment, tweet, or blog having the recognized words as contents.

12. The apparatus of claim 1, wherein the email or web application that is associated with the virtual object is determined solely based on the direction that the user faces after the gesture and without regard to the content of the recognized utterance made by the user.

13. The apparatus of claim 1, wherein the audio recognition processing is not executed or started prior to the determination of the email or web application that corresponds to the application program icon.

14. A method, comprising:
obtaining a movement signal indicating a gesture of a user;
determining that a virtual object is present at a position along a relative direction from the user corresponding to a direction that the user faces after the gesture, the virtual object visually depicting an associated application program icon;
determining, based on the direction that the user faces after the gesture, an email or web application that corresponds to the application program icon;
executing audio recognition processing for providing a content of recognized audio to the email or web application, the audio recognition processing including:
collecting, via a microphone, voices uttered by the user while facing the direction corresponding to the relative direction along which the virtual object is present;
obtaining a recognition of the utterance made by the user facing the corresponding direction;
issuing, after the determination of the email or web application that corresponds to the application program icon, an audio command, based on the recognized utterance, to the email or web application that corresponds to the application program icon whose associated virtual object is determined to be present at the position along the relative direction from the user corresponding to the direction that the user faces after the gesture; and
providing, to the email or web application and as the content of the recognized audio, a transcription text of the recognized utterance; and
transmitting a message via packet communication, through the email or web application,
wherein the transmitted message includes the transcription text that contains the recognized utterance, and the email or web application that is corresponds to the application program icon is determined without regard to content of the recognized utterance made by the user.

15. The method of claim 14, wherein the gesture comprises moving a head of the user.

16. The method of claim 14, wherein the content of the recognized utterance consists of recognized words spoken by the user.

17. The method of claim 16, wherein the recognized words spoken by the user are provided to the email application to generate an electronic mail having the recognized words as contents.

18. The method of claim 16, wherein the recognized words spoken by the user are provided to the web application to generate an electronic comment, tweet, or blog having the recognized words as contents.

19. A non-transitory, computer-readable medium having embodied thereon a program, which when executed by a computer causes the computer to execute a method, the method comprising:
obtaining a movement signal indicating a gesture of a user;
determining that a virtual object is present at a position along a relative direction from the user corresponding to a direction that the user faces after the gesture, the virtual object visually depicting an associated application program icon;
determining, based on the direction that the user faces after the gesture, an email or web application that corresponds to the application program icon;
executing audio recognition processing for providing a content of recognized audio to the email or web application, the audio recognition processing including:
collecting, via a microphone, voices uttered by the user while facing the direction corresponding to the relative direction along which the virtual object is present;
obtaining a recognition of the utterance made by the user facing the corresponding direction;
issuing, after the determination of the email or web application that corresponds to the application program icon, an audio command, based on the recognized utterance, to the email or web application that corresponds to the application program icon whose associated virtual object is determined to be present at the position along the relative direction from the user corresponding to the direction that the user faces after the gesture; and
providing, to the email or web application and as the content of the recognized audio, a transcription text of the recognized utterance; and
transmitting a message via packet communication, through the email or web application,
wherein the transmitted message includes the transcription text that contains the recognized utterance, and the email or web application that corresponds to the application program icon is determined without regard to content of the recognized utterance made by the user.

20. The non-transitory, computer-readable medium of claim 19, wherein the gesture comprises moving a head of the user.

21. The non-transitory, computer-readable medium of claim 19, wherein the content of the recognized utterance consists of recognized words spoken by the user.

22. The non-transitory, computer-readable medium of claim 21, wherein the recognized words spoken by the user are provided to the email application to generate an electronic mail having the recognized words as contents.

23. The non-transitory, computer-readable medium of claim 21, wherein the recognized words spoken by the user are provided to the web application to generate an electronic comment, tweet, or blog having the recognized words as contents.

\* \* \* \* \*